United States Patent

Ito et al.

[11] Patent Number: 5,145,456
[45] Date of Patent: Sep. 8, 1992

[54] AUTOMOTIVE AIR-CONDITIONER

[75] Inventors: Koichi Ito, Kariya; Hideo Asano, Gifu; Akihito Higashihara, Chiryu, all of Japan

[73] Assignee: Nippondenso Co., Ltd., Kariya, Japan

[21] Appl. No.: 705,808

[22] Filed: May 28, 1991

[30] Foreign Application Priority Data

May 29, 1990 [JP] Japan .................................. 2-139239
Dec. 19, 1990 [JP] Japan .................................. 2-403718

[51] Int. Cl.$^5$ ............................................ F16K 31/02
[52] U.S. Cl. ................................... 454/75; 236/78 C; 251/129.04
[58] Field of Search ............... 236/49.3, 78 C; 251/129.04, 901; 454/75

[56] References Cited

U.S. PATENT DOCUMENTS 2,577,564 12/1951 Borden, Sr. ................. 251/129.04 X
4,481,451 11/1984 Kautz et al. ................. 251/129.04 X

FOREIGN PATENT DOCUMENTS 0296555 12/1988 European Pat. Off. .
3237816  5/1983 Fed. Rep. of Germany .
64-85809  3/1989 Japan .

OTHER PUBLICATIONS

Patent Abstracts of Japan, vol. 12, No. 448 (M-768)[3295], Nov. 24, 1988 and JP-A-63 180 512 Jul. 1988.
Patent Abstracts of Japan, vol. 12, No. 437 (M-765)[3284], Nov. 17, 1988 and JP-A-63 170 188, Jul. 1988.

*Primary Examiner*—William E. Wayner
*Attorney, Agent, or Firm*—Cushman, Darby & Cushman

[57] ABSTRACT

An automotive air-conditioner has a casing forming an air passage through which an air passes and a film damper slidably disposed in the casing in such a manner to face to the air passage. The film damper having openings opens and closes the air passage. Holes are disposed on the film damper for indicating a position of the opening: Photointerrupters are disposed on the casing to detect the holes and output a present position signal that shows a present position of the film damper. A mode setting portion outputs a target position signal that shows a target position of the film damper. A microcomputer compares the present position signal with the target position signal, so that the microcomputer controls the film damper to stop at the target position.

6 Claims, 20 Drawing Sheets

AUTOMOTIVE AIR-CONDITIONER

The present application is based on Japanese Patent applications No. 2-139239 filed on May 29, 1990 and No. 2-403718 filed on Dec. 19, 1990, and claims priority of these Japanese Patent applications which are incorporated herein by reference.

FIELD OF THE INVENTION

The present invention relates generally to an automotive air-conditioner. More particularly, it relates to one which has a film damper.

BACKGROUND OF THE INVENTION

An automotive air-conditioner selects an air-outlet from a plurality of air-outlets by moving a film damper having opening portions. The film damper is provided in a casing close to the air-outlet so as to change a direction of a conditioned air discharged into a passenger compartment. The automotive air-conditioner of this type is described in the Japanese laid open patent publications 63-166618 and 64-85809.

The film damper is connected to a control lever disposed on a control panel through a link mechanism. The control lever is used to select the air-outlet. The film damper is moved to a predetermined position responding to a position of the control lever which is driven by a passenger.

The film damper moved by an electric motor for a predetermined distance in response to the position selected by the control lever has also been proposed instead of the machanical control lever.

However, the automotive air-conditioner having the film damper driven by the electric motor has a difficulty in stopping the film damper precisely at a constant position so as to face the air-outlet on the casing and the opening of the film damper. This difficulty is caused by factors of a backlash of the electric motor, a sag of the film damper or a shortage of rigidity of a driving arm connecting the electric motor and the film damper, etc.

As a result, the air-outlet can not be closed by the film damper so that a conditioned air leaks therethrough. And that an air-blowing ratio of the conditioned air discharged through two or more air-outlets, such as bi-level mode, can not be controlled precisely.

SUMMARY OF THE INVENTION

An object of the present invention is to provide an automotive air-conditioner having the film damper which can stop precisely at the arbitrary position. Another object of the present invention is to provide an automotive air-conditioner having the film damper on which a detected object is disposed, detecting means for detecting the detected object and a driving means for moving the film damper so that the position of the film damper can be precisely detected and can be always stopped at the constant position.

DETAILED DESCRIPTION OF THE PREFERRED EMBODIMENTS

Figure 1:
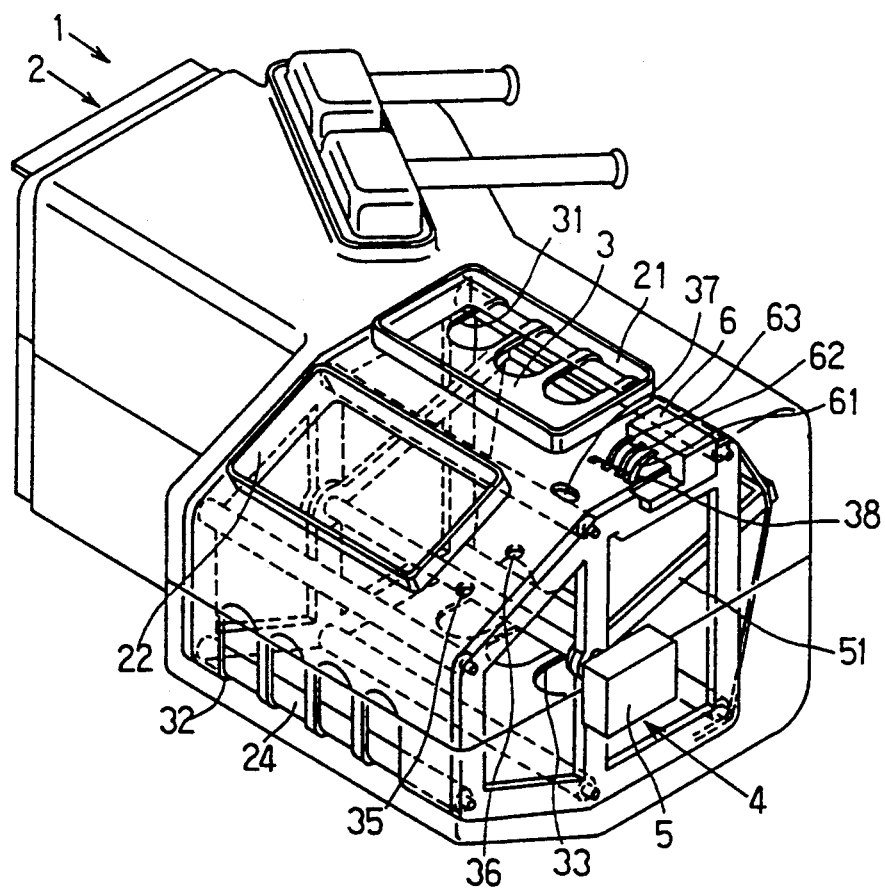
FIG. 1 is a perspective view of a mode selecting case of the first embodiment for selecting one or more air-outlets.
Figure 2:
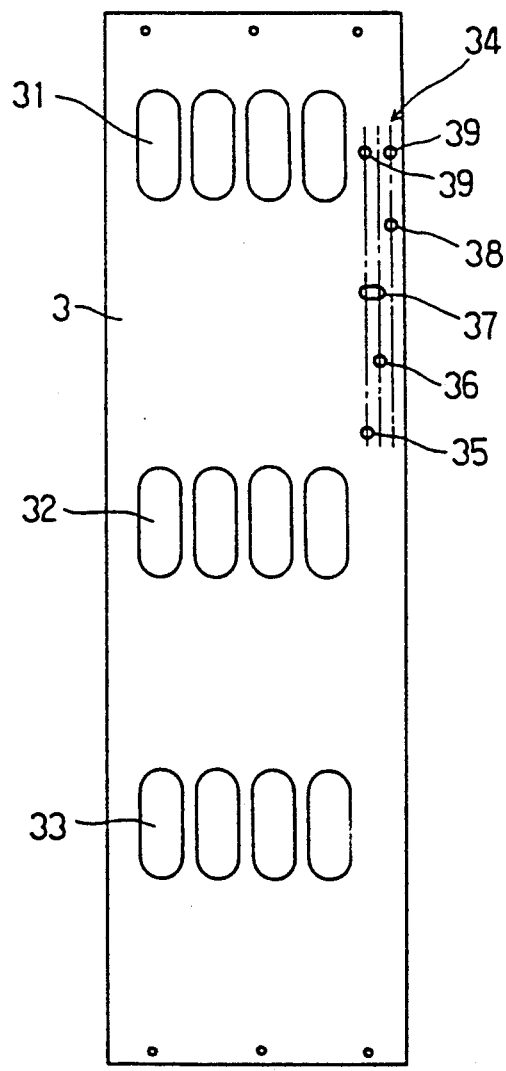
FIG. 2 is a development elevation of a film damper of the first embodiment.

FIGS. 1-11 show the first embodiment of the present invention. A mode selecting case 2 of air-outlets for an automobile air-conditioner is shown in FIG. 1. An automotive air-conditioner 1 for heating, cooling or dehumidifing a passenger compartment includes the mode selecting case 2, a film damper 3 and a position control apparatus 4 for positioning the film damper 3.

The mode selecting casing 2 of air-outlet accommodates an air-conditioning apparatus, such as a heater core.

A defrosting air-outlet 21, a ventilating air-outlet 22 and heating (foot) air-outlet 23, which correspond to air passages of the present invention, are formed on a side wall of the mode selecting casing 2 of air-outlets.

A conditioned air is discharged to a wind shield of an automobile through the defrosting air-outlet 21, to a face and a chest of a passenger through the ventilating air-outlet 22 and to a foot of a passenger through the heating air-outlet 23.

The film damper 3 is made of flexible polyethylene resin and is formed to be endless by connecting both ends thereof to each other. The film damper 3 is slidably disposed in the mode selecting case 2 in such a manner to face to the air-outlets 21-23 as shown in FIGS. 2-7. The film damper 3 is slidably supported on and stretched by plural spindles 24 which is rotatably disposed in the mode selecting case 2, and has the first opening 31, the second opening 32, the third opening 33 and a detected object 34.

The first opening 31 formed at one end of the film damper 3 communicates an inside of the mode selecting case 2 with an outside of the same through the defrosting air-outlet 21 when a foot-defrosting (F/D) mode or a defrosting (DFF) mode is selected.

The second opening 32 formed in the middle of the film damper 3 communicates the inside of the mode selecting case 2 with the outside through the ventilating air-outlet 22 when a ventilating (VENT) mode or a bi-level (B/L) mode is selected.

The third opening 33 formed at the opposite end of the film damper 3 communicates the inside with the outside through the foot air-outlet 33 when the B/L mode, a foot (FOOT) mode or the F/D mode is selected.

The detected object 34 is comprised of the first through the fifth target holes 35-39. The first through the fourth target holes 35-38 represent stop positions of the film damper 3 in the VENT mode, in the B/L mode, in the FOOT mode and in the F/D mode respectively. The fifth target holes 39, which is comprised of two holes, represent a stop position of the film damper 3 in the DEF mode.

Figure 8:
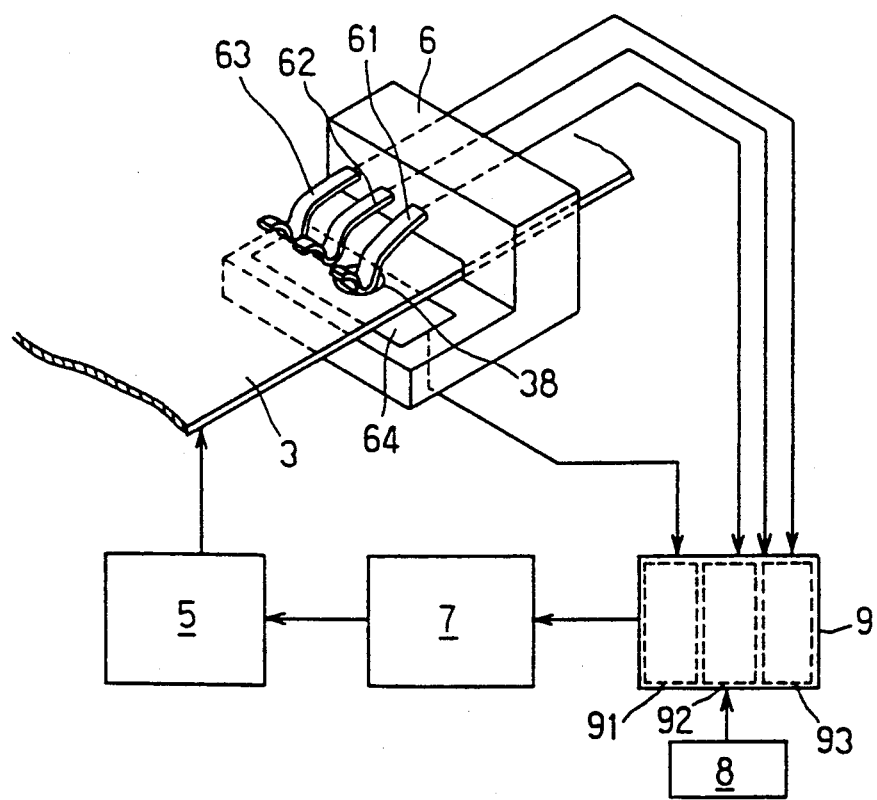
FIG. 8 is a partial perspective view of a limit switch and a block diagram of displacement amount control system shown in FIG. 1.

The position control apparatus 4, includes an electric motor 5, a limit switch 6, a power assist controller 7, a mode setting apparatus 8 for selecting mode and a microcomputer 9 as shown in FIG. 8. The electric motor 5 fixed on the mode selecting case 2 swings a driving arm 51 within a predetermined range of a rotation angle when an operating voltage is supplied thereto. The driving arm 51 is connected to an output axis of the electric motor 5 at the first end thereof and is connected to both ends of the film damper 3 at the second end thereof. The driving arm 51 swings on the output axis of the electric motor 5 so as to rotates the film damper 3 back and forth.

Figure 9:
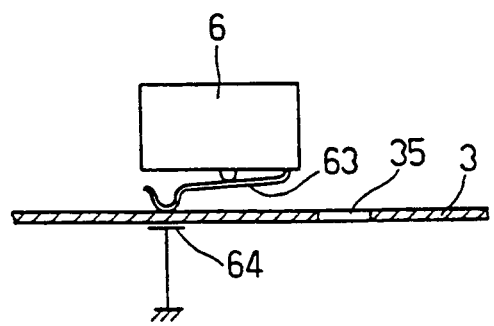
FIG. 9 is a schematic view showing an operation of a limit switch of the first embodiment of the present invention.
Figure 10:
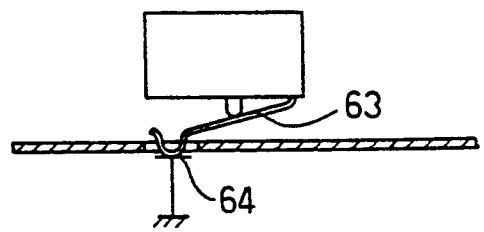
FIG. 10 is a schematic view showing an operation of a limit switch of the first embodiment of the present invention.

The limit switch 6 is fixed on the mode selecting case 2. The limit switch 6 has the first through the third contacts 61-63 which contact with a peripheral surface of the film damper 3 and a contact 64 as shown in FIGS. 9 and 10. The limit switch 6 outputs the first "ON" signal to the microcomputer 9 when the first contact 61 contacts with the contact 64, that is, the limit switch 6 detects the fourth target hole 38 and the fifth target hole 39. The limit switch 6 outputs the first "OFF" signal to the microcomputer 9 when the first contact 61 is released from the contact 64, that is, the limit switch 6 does not detect the fourth target hole 38 and the fifth target hole 39. Similarly when the second contact or the third contact contacts with the contact 64, the second "ON" signal or the third "ON" signal is outputted to the microcomputer 9 respectively. Therefore, the first through the third "ON" signals and the first through the third "OFF" signals work as the present position signals for notifying the microcomputer 9 of the present position of the film damper 3.

The power assist controller 7 controls the rotation of the electric motor 5 corresponding to a signal output from the microcomputer 9. The mode setting apparatus 8 outputs a mode select signal for selecting the blowing air of the air-conditioner 1. The mode select signal is corresponded to the set condition of a mode select switch disposed on an operating panel in a passenger compartment or the output state of a sensor detecting environmental condition, such as temperature, humidity or value of solar radiation, etc. of the passenger compartment.

The microcomputer 9 has a mode detecting function 91, a control function 92 and a judging function 93. The mode detecting function 91 detects the mode select signal output from the mode setting apparatus 8, calculates a target position signal in response to the mode select signal and outputs the target position signal to the control function 92 and the judging function 93. The control function 92 controls the power of the electric motor 5 in such a manner that the electric motor 5 rotates forwardly or reversely, or steps correspondingly to the target position signal output from the mode detecting function 91, the present position signal of the film damper 3 output from the limit switch 6 or the stop signal described later.

The judging function 93 judges the stop position of the film damper 3 by using the present position signal and the target position signal. The judging function 93 outputs the stop signal to the control function 92 so as to stop the rotation of the electric motor 5 when the film damper 3 reaches the stop position, that is, the target position coinside with the present position. Since an equation of the time for inputting each "ON" or "OFF" signal of the present position signal should be considered, it is preferred to read the signal continuously within the predetermined short period such as 0.1-0.2 sec or simultaneously.

TABLE 1

| air-blowing mode | contact No. 61 | contact No. 62 | contact No. 63 | decimal number |
|---|---|---|---|---|
| VENT | 0 | 0 | 1 | 1 |
| B/L | 0 | 1 | 0 | 2 |
| FOOT | 0 | 1 | 1 | 3 |
| F/D | 1 | 0 | 0 | 4 |
| DEF | 1 | 0 | 1 | 5 |

Table 1 shown the target position signal in each air-blowing mode. In Table 1, the first through the third ON signals are shown as "1" signal and the first through the third OFF signals are shown as "0" signal.

Figure 11:
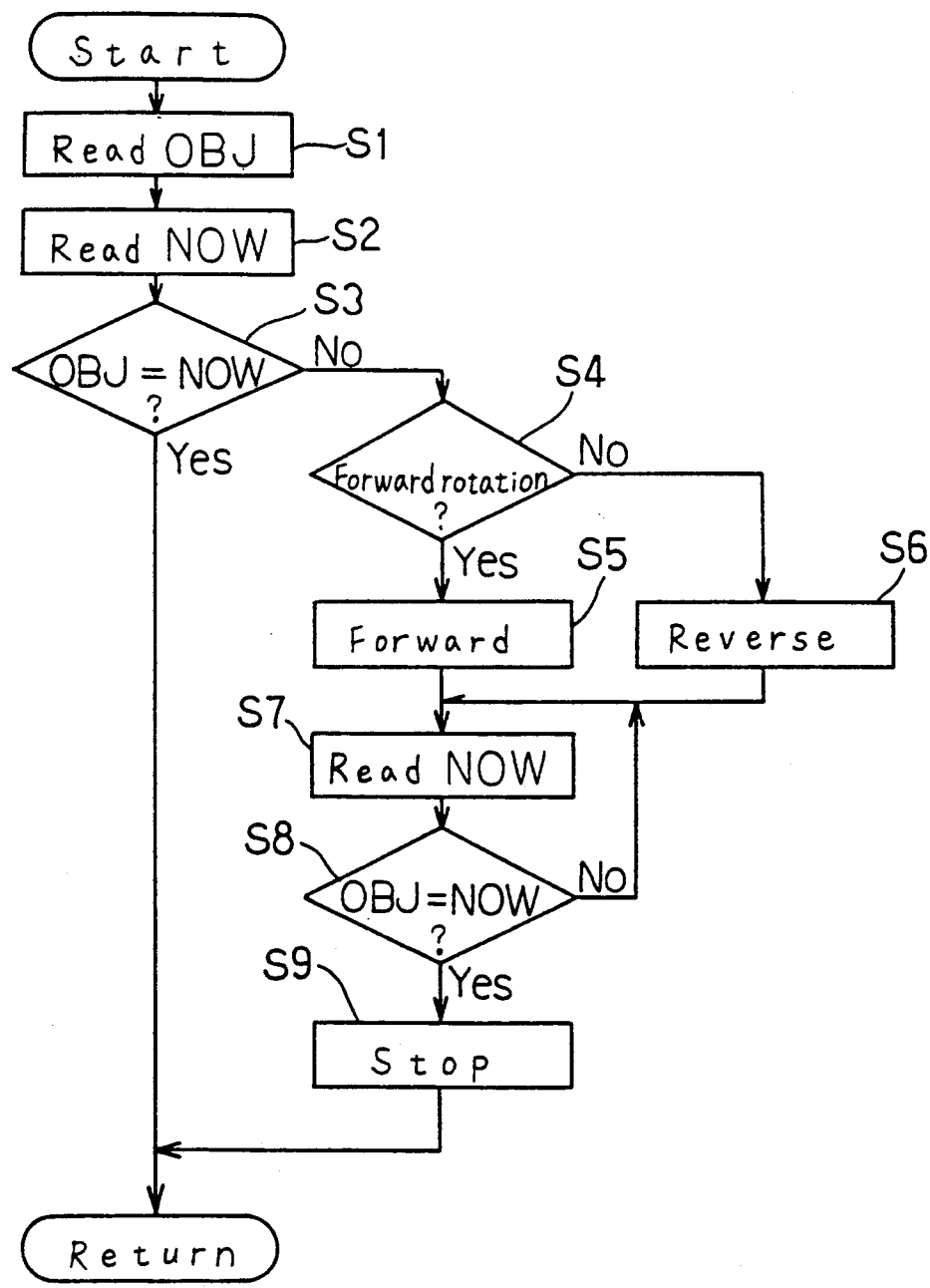
FIG. 11 is a flow chart showing an operation of a micro computer of the first embodiment of the present invention.

The flow chart illustrating a control of the microcomputer 9 of the present invention is shown in FIG. 11. Step 1 is a step to read the target position (OBJ) of the film damper 3 by detecting the mode select signal outputted from the mode setting apparatus 8. Step 2 is a step to read the present position (NOW) of the film damper 3 by detecting the present position signal of the film damper 3 output from the limit switch 6. Step 3 is a step to judge whether the present position coincides with the target position (OBJ=NOW) or not by comparing the present position with the target position. When OBJ=NOW, i.e., in the case of "Yes", the sequence returns to the start 1. When OBJ=NOW, i.e., in the case of "No" at the step 3, whether the electric motor 5 should be rotated positively or not is judged at Step 4 to drive the film damper 3 from the present position to the target position by comparing the present position with the target position. When the positive rotation of the electric motor 5 is judged, i.e., in the case of "Yes", the power assist controller 7 is supplied with power sc that the electric motor 5 rotates forwardly at Step 5. When the reverse rotation of the electric motor 5 is judged, i.e., in the case of "No", the power assist controller 7 is supplied with power in such a manner that the electric motor 5 rotates reversely at Step 6. The present position signal of the film damper 3 output from the limit switch 6 is detected and the present position (NOW) of the film damper 3 is read in at Step 7. Whether the present position conforms with the target position (OBJ=NOW) or not is judged by comparing the present position with the target position at Step 8. When OBJ≠NOW, i.e., in the case of "No" at Step 8, the sequence returns to Step 7. When OBJ=NOW, i.e., in the case of "Yes" at Step 8, the power assist controller 7 is supplied with power to stop the rotation of the electric motor 5 at Step 9. Then the sequence returns to the start.

Figure 3:
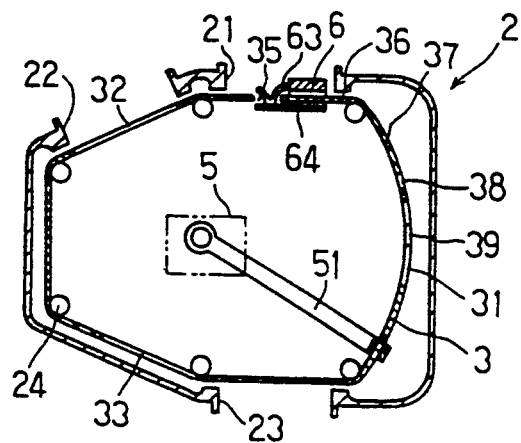
FIG. 3 is a sectional view of a mode selecting case shown in FIG. 1 to explain an operating state of a film damper.
Figure 4:
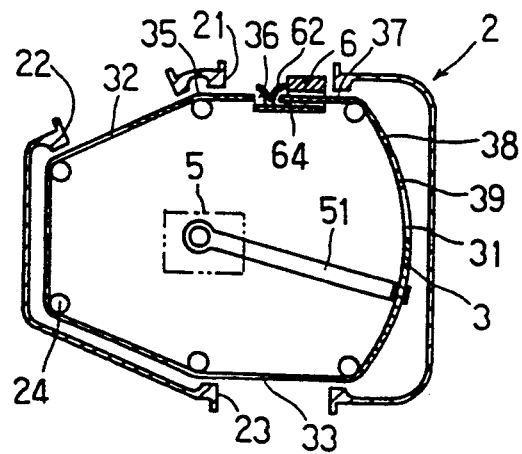
FIG. 4 is a sectional view of a mode selecting case shown in FIG. 1 to explain an operating state of a film damper.
Figure 5:
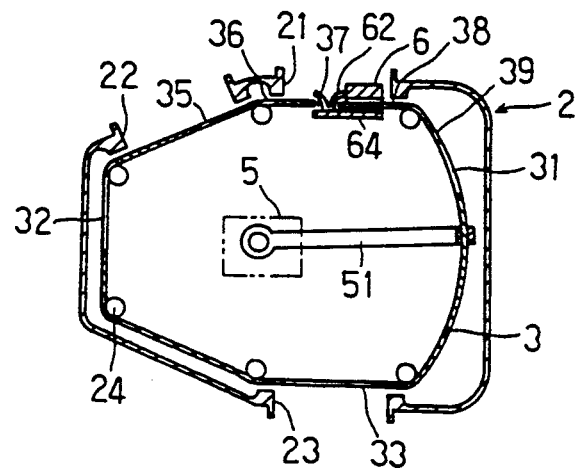
FIG. 5 is a sectional view of a mode selecting case shown in FIG. 1 to explain an operating state of a film damper.
Figure 6:
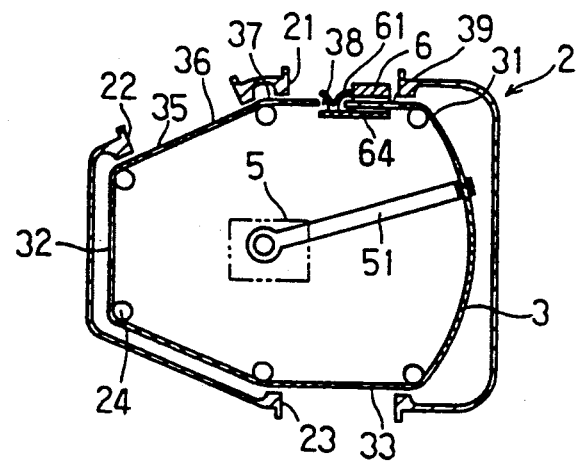
FIG. 6 is a sectional view of a mode selecting case shown in FIG. 1 to explain an operating state of a film damper.

The operation of this embodiment of the automotive air-conditioner 1 is described based on FIGS. 1 through 10. The microcomputer 9 reads the target position signal corresponding to the mode select signal output from the mode setting apparatus 8, and the microcomputer 9 also reads the present position signal output from the limit switch 6 simultaneously. When B/L mode is selected, for example, the target position signal of B/L mode is (0,1,0). The film damper 3 is positioned in such a manner that only the second contact 62 of the limit switch 6 contacts with the contact 4, that is, as only the second target hole 36 formed on the film damper 3 is detected by the limit switch 6, the present position signal formed from the first "OFF" signal, the second "ON" signal and the third "OFF" signal, namely (0,1,0) is output to the microcomputer 9. The microcomputer compares the target position with the present position, and when the target position is different from the present position, the microcomputer 9 outputs the signal to the power assist controller 7 in order to rotate the electric motor 5 forwardly. The electric motor 5 moves the film damper 3 to the direction of the arrow shown in FIG. 4 through the driving arm 51. While the film damper 3 is moving, the microcomputer 9 reads in the present position signal again. When the film damper 3 does not reach the rotation position which the ventilating air-outlet 22 formed on the mode selecting case 2 faces the second opening 32 of the film damper 3, the first through the third contacts 61-63 of the limit switch 6 do not contact with the contact 64, that is to say, as the first through the fifth target holes 35-39 are not detected by the limit switch 6, the present position signal which is the first "OFF" signal, the second "OFF" signal and the third "OFF" signal, namely (0,0,0), is output to the microcomputer 9 so that the film damper 3 keeps being driven by the electric motor 5. When the film damper 3 is driven to the rotation position which only the third contact 63 of the limit switch 6 contacts with the contact 64, only the first target hole 35 is detected by the limit switch 6 and the present position signal consisting of the first "OFF" signal, the second "OFF" signal and the third "ON" signal, namely (0,0,1) is output to the microcomputer 9. Then, the microcomputer 9 judges that the target position signal conforms with the present position signal and outputs a signal to the power assist controller 7 so as to stop the rotation of the electric motor 5. As a result, the movement of the film damper 3 as well as the electric motor 5 is stopped and the ventilating air-outlet 22 faces to the second opening 32 as shown in FIG. 3. Therefore, a conditioned air is discharged toward an a face and a chest of a passenger through the ventilating air-outlet 22. Similarly, when the mode select signal of the B/L mode is output from the mode setting apparatus 8, the film damper 3 is driven to the rotation position by the electric motor 5 as shown in FIG. 4. Further, when the mode select signal of the FOOT mode is output, the film damper 3 is driven to the rotation position by the electric motor 5 as shown in FIG. 5. Still further, when the mode select signal of the F/D mode is output, the film damper 3 is driven to the rotation position by electric motor 5 as shown in FIG. 6.

Figure 7:
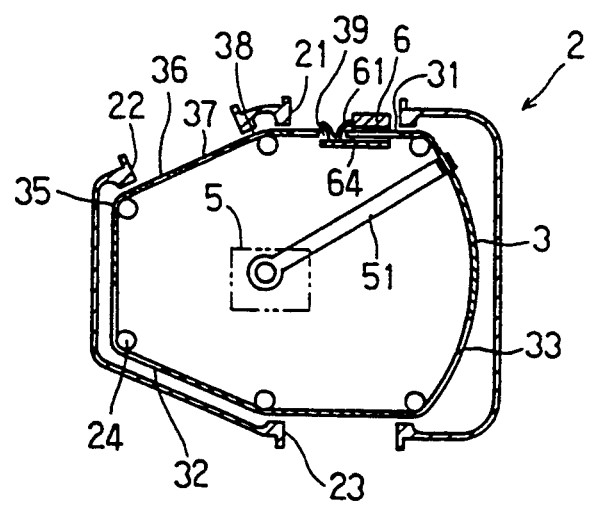
FIG. 7 is a sectional view of a mode selecting case shown in FIG. 1 to explain an operating state of a film damper.

When the mode select signal of the DEF mode is output, the film damper 3 is driven to the rotation position by electric motor 5 as shown in FIG. 7. Since the film damper should be stopped when the detected object corresponding to the air-blowing mode to be selected is detected by the limit switch 6, the rotation of the electric motor 5 should be stopped at the constant stop position even if a backlash of the electric motor 5, a sag of the film damper 3 or a shortage of rigidity of the driving arm 51 are occured. The faults that a conditioned air leaks through the air-outlet which should be closed and an air-blowing ratio in the mode that a conditioned air is discharged through two or more air-outlets such as B/L mode or F/D mode, are not occured since the movement of the film damper 3 moves can be well controlled.

Figure 12:
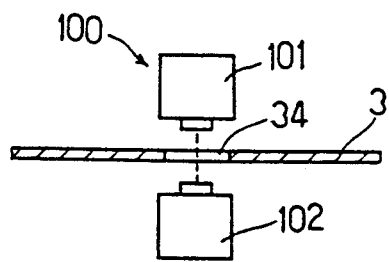
FIG. 12 is a schematic view of a transmission type photoelectric switch and a film damper of the second embodiment of the present invention.

The second embodiment of an automotive air-conditioner of the present invention is shown in FIG. 12. A transmission photoelectric switch 100 having a projector 101 and a light-intercepter 102 as a detecting means instead of the limit switch 6 is used. The film damper 3 made of an opaque film is disposed between the projector 101 and the light-interceptor 102 of the switch 100.

The detected object 34 is detected when the light-interceptor 102 receives a light from the projector 101. An infrared light emitting diode is used for a light source of the, projector and a phototransistor is used for light-interceptor element of the light-interceptor 102.

Figure 13:
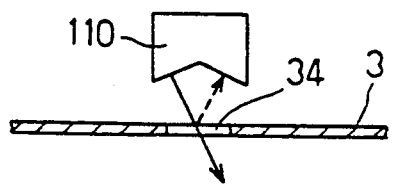
FIG. 13 is a schematic view of a direct-reflection type photoelectric switch and a film damper of the third embodiment of the present invention.

The third embodiment of the present invention is shown in FIG. 13. A direct reflector type photoelectric switch 110 is used as the detecting means instead of the transmission photoelectric switch. This photoelectric switch 110 radiates a laser beam and receive the laser beam reflected by the film damper 3.

Figure 14:
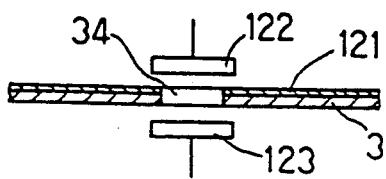
FIG. 14 is a schematic view of two electrodes and a film damper with a dialectic film of the fourth embodiment of the present invention.

The fourth embodiment of the present invention is shown in FIG. 14. A dialectic film 121 is formed at least on the surface of the film damper 3. The film damper 3 with dialectic film 121 is disposed between the first electrode 122 and the second electrode 123 as the detecting means. The detected object formed from the holes 34 is detected by detecting the displacement of capacitance.

Figure 15:
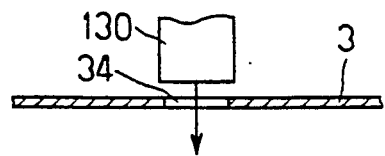
FIG. 15 is a schematic view of an ultrasonic sensor and a film damper of the fifth embodiment of the present invention.

The fifth embodiment of the present invention is shown in FIG. 15. An ultrasonic sensor 130 instead of the limit switch 6 is used in this embodiment. The ultrasonic sensor 130 detects echoes of an ultrasonic pulse generated from the ultrasonic sensor 130. When the echoes can not be detected by the ultrasonic sensor 130, the detected object 34 formed from the holes is judged to be detected.

Figure 16:
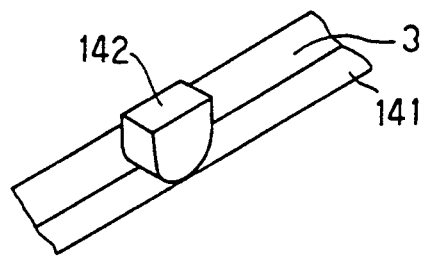
FIG. 16 is a schematic view of a magnetic head and a film damper to which a magnetic tape adheres of the sixth embodiment of the present invention.

The sixth embodiment of the present invention is shown in FIG. 16. A magnetic tape 141 is adhered to the surface of the film damper 3. A magnetic head 142 is used for the detecting means. The magnetic tape 141 is composed of magnetic material and non-magnetic material. The magnetic head 142 is composed of magnetic material having a micro gap and rolled with a coil. The magnetic head 142 generates electromagnetic force by receiving the action of the magneflux from the magnetic material of the coil when the film damper 3 with the magnetic tape 141 is moved and the magnetic material of the magnetic tape 141 is placed under the magnetic head 142. When the electromagnetic force is generated, the detected object is detected its position.

Figure 17:
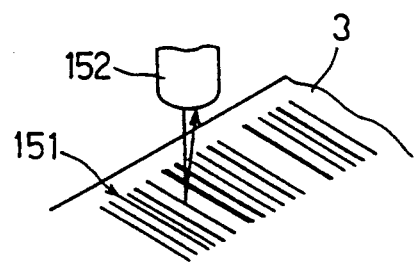
FIG. 17 is a schematic view of a bar-code scanner and a film damper on which a bar-code is printed of the seventh embodiment of the present invention.
Figure 18:
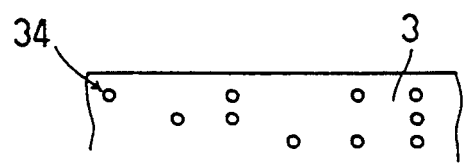
FIG. 18 is a partial schematic view of a film damper showing one of modified embodiments.
Figure 19:
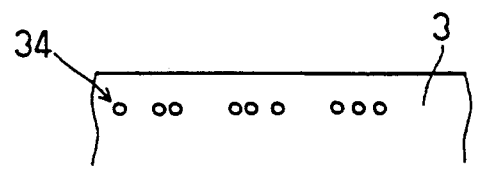
FIG. 19 is a partial schematic view of a film damper showing one of modified embodiment.
Figure 20:
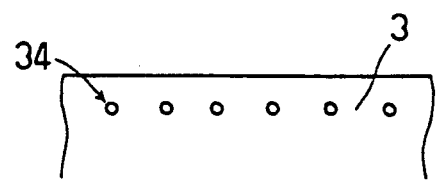
FIG. 20 is a partial schematic view of a film damper showing one of modified embodiment.

The seventh embodiment of the present invention is shown in FIG. 17. A bar-code 151 printed on the film damper 3 is used for the detected object and a scanner 152 which reads in the bar-code is used for the detecting means. The stop position of the film damper 3 can be detected by the difference of the width of the longitudinal line between the bar-code 151 at the stop position of the film damper 3 and the bar-code at other position. Marks such as letters or signs may be disposed on the film damper 3 instead of the bar-code 151 and the marks may be read by an optical character reader. The detecting means is not limited to the first through the seventh embodiments. The diposition of the detected object on the film damper 3 may adopt a three bits mode shown in FIG. 18, a mode that three holes in one row shown in FIG. 19 or one bit mode shown in FIG. 20.

The number of the air passage may be one. In this case, the opening area of the air passage is adjusted by the film damper, so that the air-blowing capacity can be adjusted. Like this, the number of the air passages is suitable for one or more. In the above embodiments the film damper is used as the change-over damper for the air-outlet, however, the film damper is suitable for every place where an air passage is changed over by using a damper.

Figure 21:
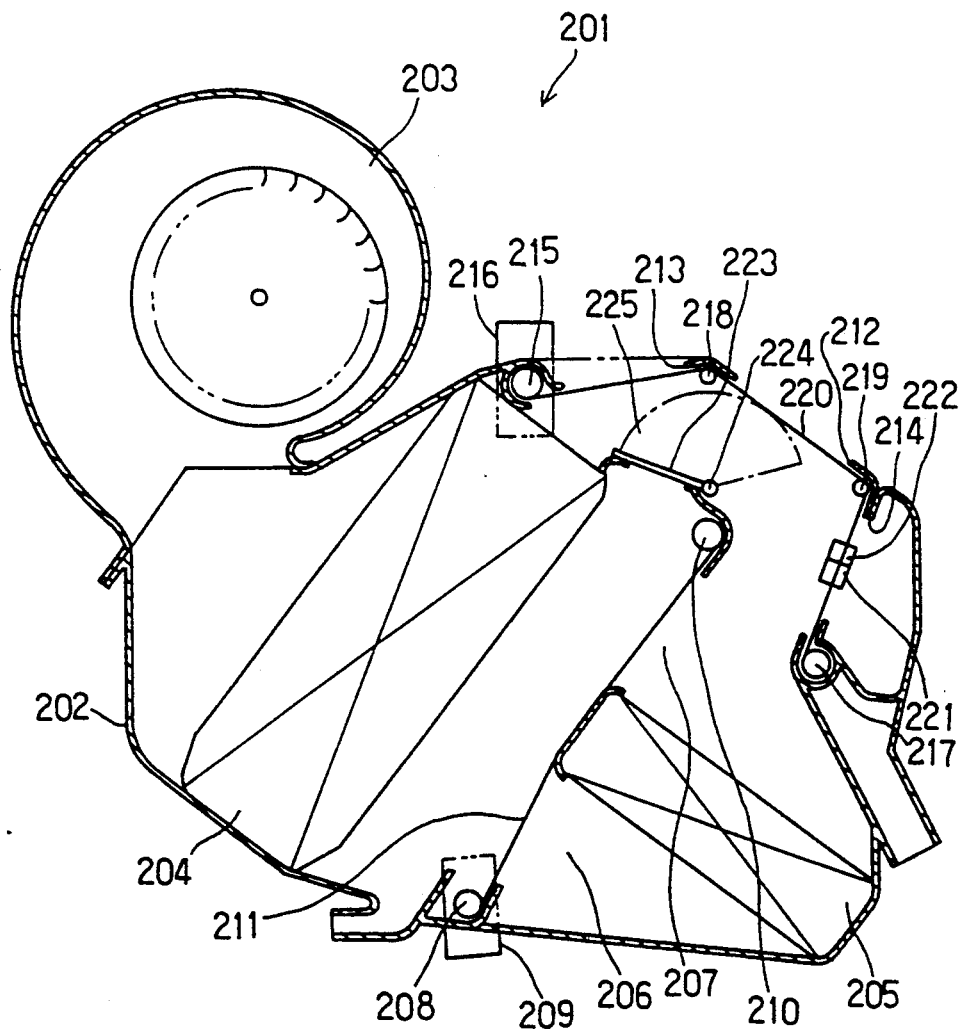
FIG. 21 is a cross-sectional view of an automotive air-conditioner of the eighth embodiment of the present invention.

The eighth embodiment of the present invention which presents an air-conditioner unit disposed in the center of an automobile is shown in FIGS. 21 through 29. As shown in FIG. 21, a blower 203 is disposed in an upstream position of a duct 202 of the automotive air-conditioner. An evaporator 204 which cools an air is disposed in the almost center of the duct 202 and in the downstream portion of the blower 203. A heater core 205 is disposed in the downstream position of the evaporator 204 and at the bottom of the duct 202 so as to keep a nearly vertical position toward the evaporator 204. A passage 206 is defined upstream of the heater core 205. The air passing through the passage 206 is heated while the same passes through the heater core 205. A passage 207 is defined downstream of the heater core 205. The passage 207 is formed as a bypass passage where the air cooled by the evaporator 204 passes to bypass the passage 206. A wind shaft 208 is disposed downstream of the evaporator 204 and at the bottom of the duct 202, and rotatably disposed in the duct 202. An electric motor 209 interlocked with the wind shaft 208 drives the wind shaft 208. A wind shaft 210 is disposed downstream of the evaporator 204 and at the position facing to the upper end of the evaporator 204, and rotatably disposed in the duct 202. A film damper 211 is connected to the wind shaft 208 at the first end thereof and to the wind shaft 210 at the second end thereof. The film damper 211 is extended to cover the passages 206 and 207 and touches the side wall of the heater core 205 at the side of the evaporator 204. The capacity of the cooled air passes through the passages 206 and 207 is arbitrarily adjusted, so that the temperature of the discharging air is arbitrarily adjusted.

Figure 22:
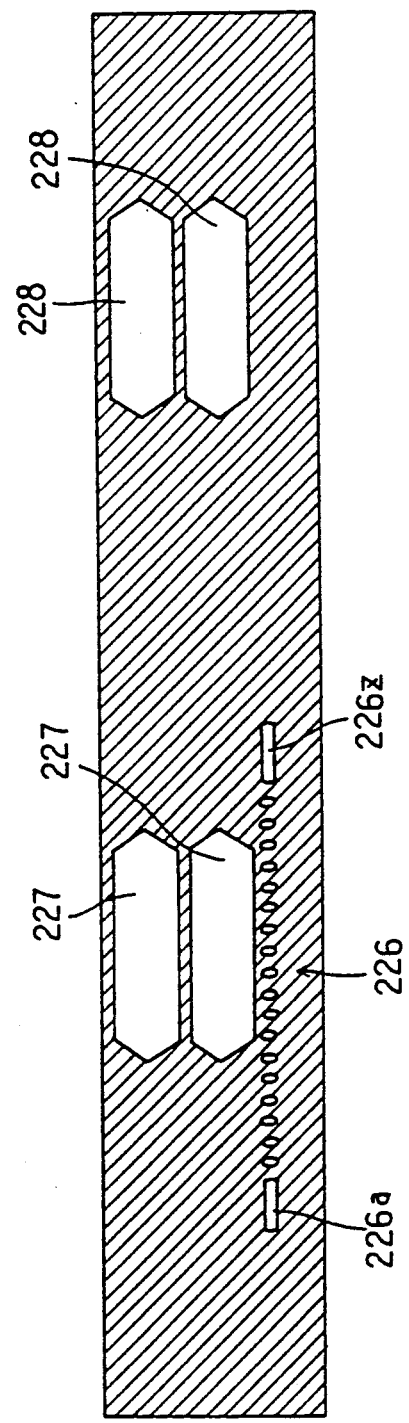
FIG. 22 is a development elevation of a film damper shown in FIG. 21
Figure 23:
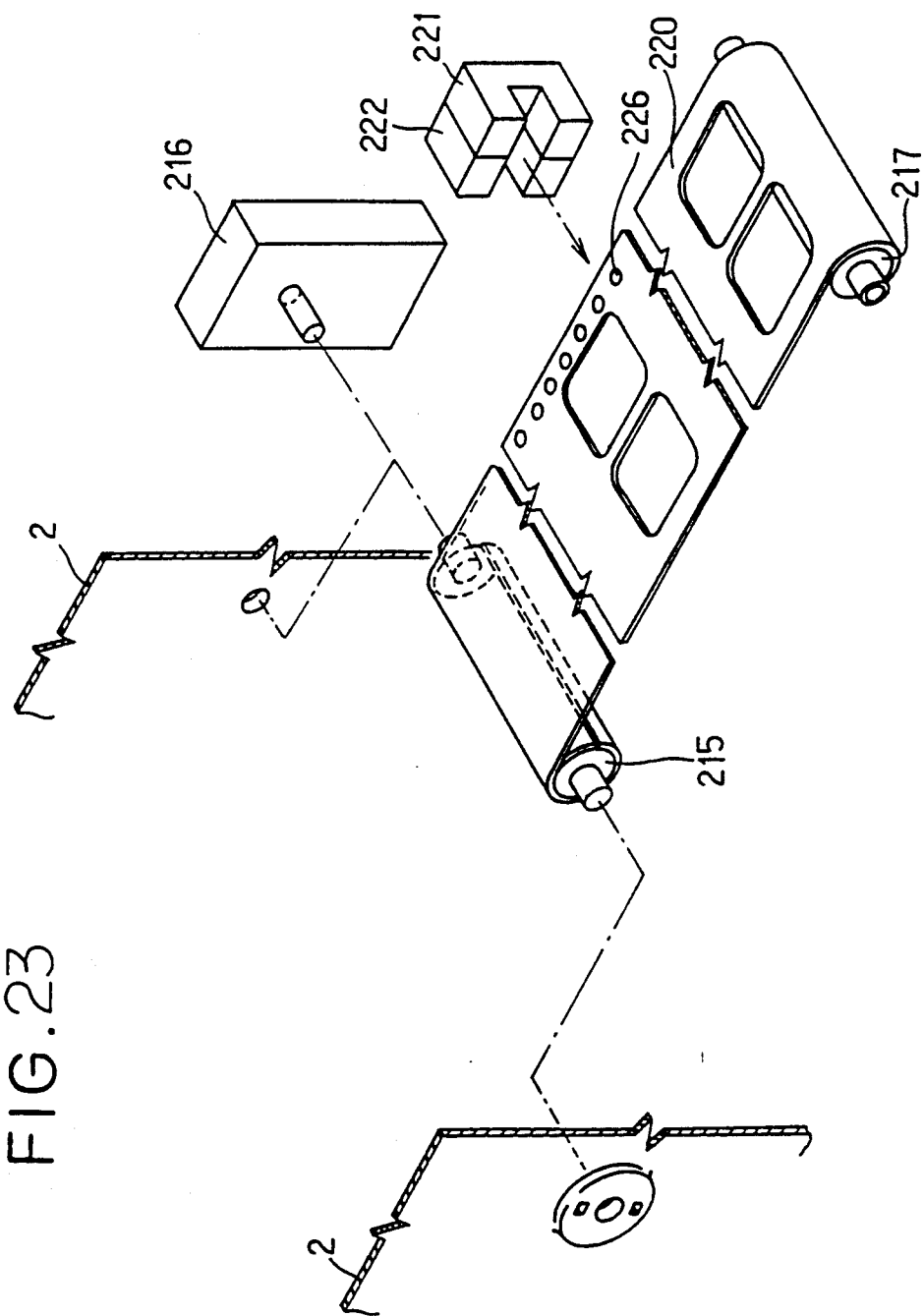
FIG. 23 is an exploded perspective view showing an assembling condition of a film damper of the eighth embodiment of the present invention.
Figure 24:
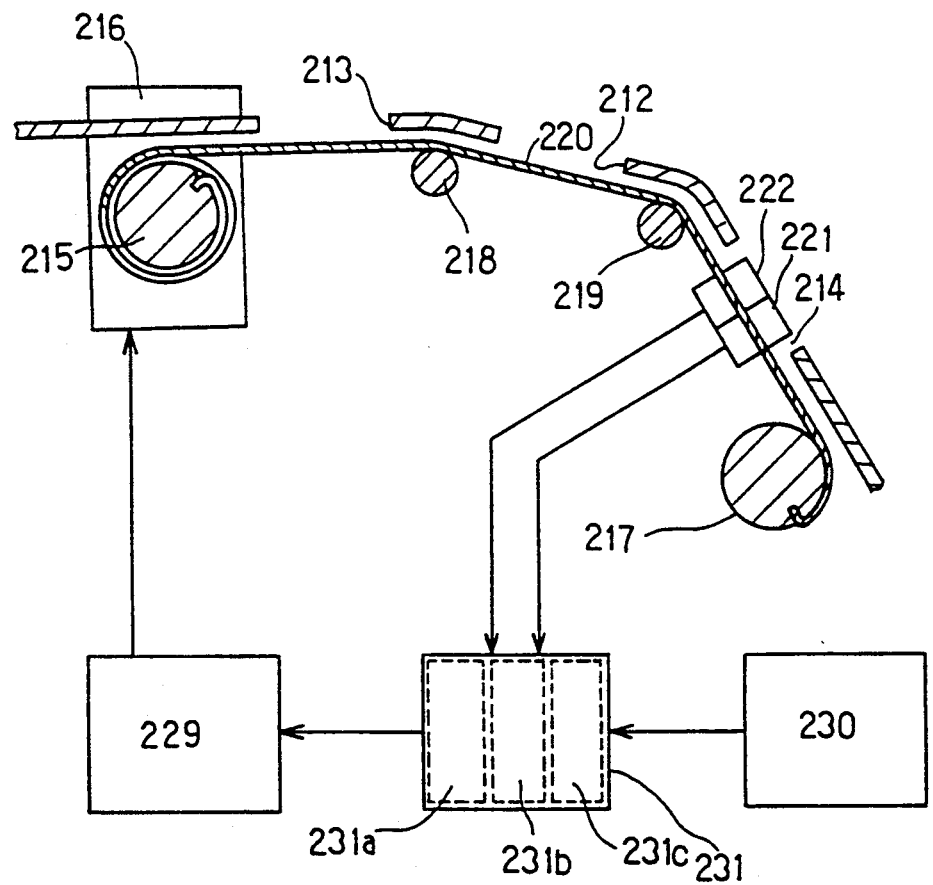
FIG. 24 is a block diagram of a control system which controls a position of a film damper of the eighth embodiment of the present invention.

A defrosting air-outlet 212 is disposed downstream of the duct 202 and the conditioned air is discharged into a wind shield of an automobile. A ventilating air-outlet 213 through which the conditioned air is discharged toward a face and a chest of a passenger is disposed downstream of the duct 202 and next to the defrosting air-outlet 212 at the side of the blower 203. A heat air outlet 214 is disposed at the downstream side of the defrosting air outlet 212 in the duct 202 and the conditioned air is discharged into a foot of a passenger. A wind shaft 215 is rotatably disposed at the side end which is the side the blower 3 of the ventilating air outlet 213 in the duct 202. The electric motor 216 interlocking with the wind shaft 215 drives the wind shaft 215. A wind shaft 217 is rotatably disposed at the side end of the heat air outlet 214 and downstream of the heater core 205. A shaft 218 is rotatably disposed inside of the duct 202 positioned between the defrosting air outlet 212 and the ventilating air outlet 213. A shaft 219 is rotatably disposed inside of the duct 202 positioned between the defrosting air outlet 212 and the heat air outlet. A film damper 220 is connected to the wind shaft 215 at the first end thereof and to the wind shaft 217 at the second end thereof. The film damper 220 is disposed to move through the gaps between the shaft 218 and the duct 202 and the shaft 219 and the duct 202 so that the film damper 220 is extended to cover the ventilating air outlet 213, the defrosting air outlet 212 and the heat air outlet 214. Photointerrupters 221 and 222 are disposed at the side end which is in the depth of FIG. 21 of the heat air outlet 214. A shaft 224 is rotatably disposed in the duct 202 and at the upper portion of the downstream of the evaporator 204. A plate damper 223 for bypassing the cooled air is fixed on the shaft 224 at the first end thereof, so that the plate damper 223 opens and closes a bypass passage 225 through which the cooled air is bypassed. The plate damper 223 rotates to the position represented by one dot line in FIG. 21 when a max cool mode is selected. Holes 226 as a detected object are disposed on the film damper 220 as shown in FIG. 22. The holes 226 are arranged at the same interval in one row and at the side end of the film damper 220 which is parallel to the moving direction of the film damper 220. Ellipses 226a and 226z are disposed at the both ends of the holes 226 arranged in one row. Openings 227 and 228 are formed on the film damper 220. The photointerrupters 221 and 222 form the shape as shown in FIG. 23 so that the photointerrupters 221 and 222 are disposed to sandwich the holes 226 at the side end of the film damper 220. When the electric motor 216 drives the film damper 220, the photointerrupters 221 and 222 detect the holes 226 in order. When the photointerrupters 221 and 222 detect the holes 226 they are in "ON" state, and when the photointerrupters 221 and 222 detect the film portion they are in "OFF" state. The photointerrupters 221 and 222 output a signal to a microcomputer 231 described later when the state is changed from "OFF" to "ON". A power assist controller 229 controls power of the electric motor 216 so that the electric motor 216 rotates forwardly or reversely, or stops correspondingly to the signal output from the microcomputer 231 described later. In FIG. 24, the arrow shows the output direction of signal. A mode setting apparatus 230 outputs a mode select signal for selecting the air-blowing mode of the air conditioner. The mode select signal corresponds to a setting condition of a mode select switch disposed on an operating panel in a passenger compartment or an output state of a sensor detecting environmental condition, such as temperature, humidity or solar radiator, etc. of the passenger compartment.

A mode detecting function 231a detects the selected signal of the air outlet transferred from the mode setting portion 230. Mode detecting function 231a calculates a target position of the film damper 220 in accordance with the selected signal, and the mode detecting function 231a outputs the target signal toward a controlling function 231b and a judging function 231c. The controlling function 231b receives signals from the mode detecting function 231a, the photointerruptor 221 and the photointerruptor 222. The controlling function 231b controls a power assist controller 229 in accordance with the received signals so that the controlling function 231b makes a motor 216 forward rotate, reverse rotate and stop.

The judging function 231c receives the position signal of the film damper 220 transferred from the photointerruptor 221 and the photointerruptor 222, the judging function 231c also receives the target position signal transferred from the mode detecting function 231a. The judging function 231c, then, decides the stopping position of the film damper 220 in accordance with the signals. The judging function 231c outputs the stopping signal toward the controlling function 231b in order to stop the rotation of the motor 216 when the film damper 220 becomes the stopping position, in other words, when the present position is coincided with the target position.

A interval L1 between the photointerruptor 221 and the photointerruptor 222 is different from the interval L2 of the holes 226. Both intervals L1 and L2 are set as follows.

$$L2 = N \times L1/N+1$$

Wherein the letter "N" represents the number of the photointerruptors.

According to the eighth embodiment, since the numeral N is 2, the interval L2 of the holes 226 is set as ⅔ of the interval of L1 between the photointerruptors 221 and 222. The moving distance L3 of the film damper 220 between the "ON" timing of the one of photointerruptors and the "ON" timing of another photointerruptor is set as follows.

$$L3 = L1-L2 = L1/N+1$$

Since the letter "N" of the eighth embodiment represents 2, the moving distance L3 is ⅓ of the interval L1, namely the moving distance L3 is half of the distance L2.

Figure 25:
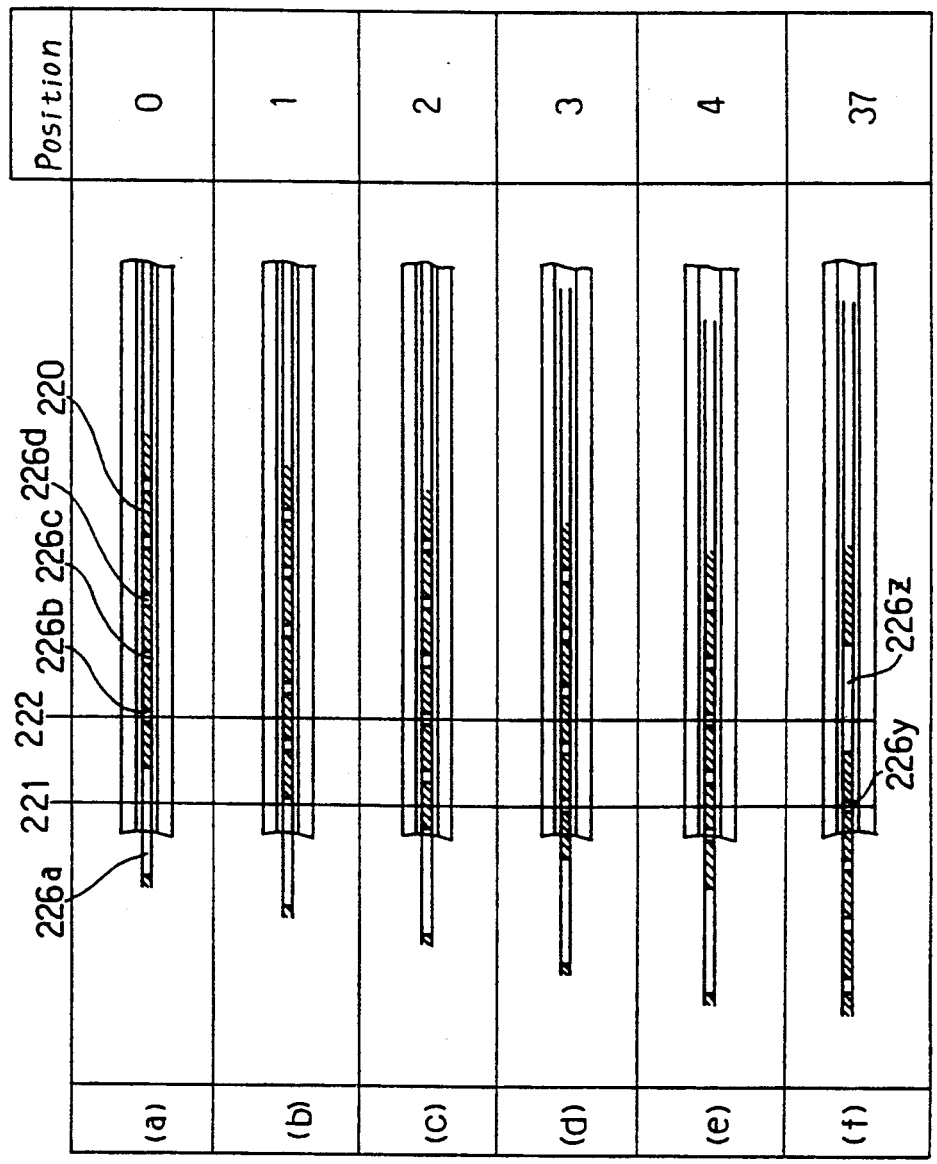
FIG. 25 is an explanation drawing showing relative positions between two photo interrupters and a detected object in each air-blowing mode.
Figure 26:
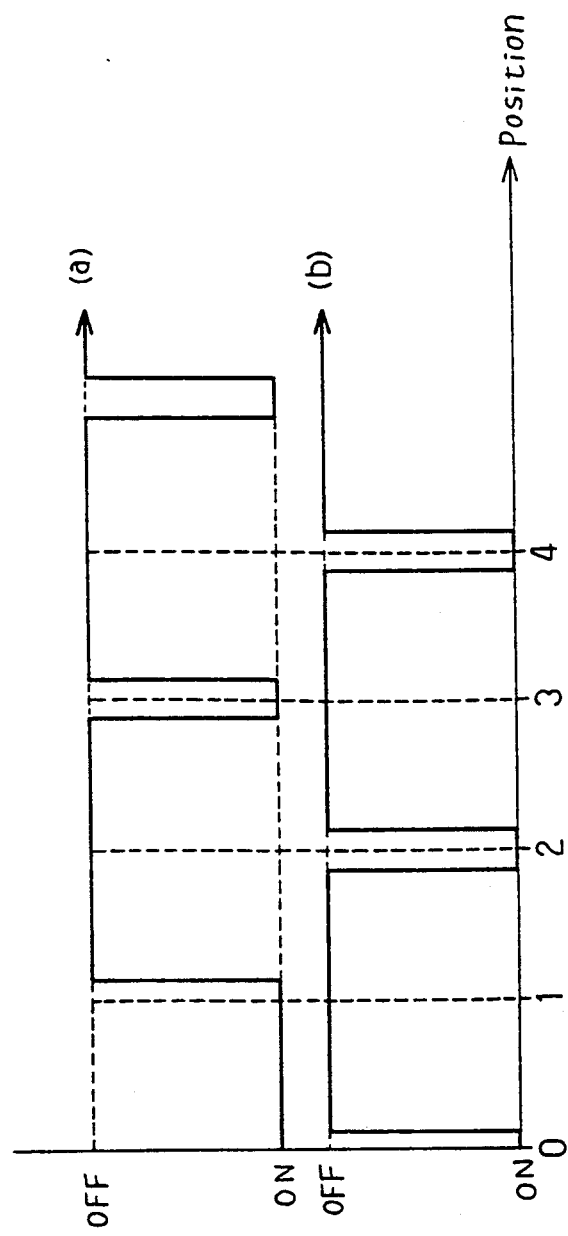
FIG. 26 is a diagram showing output signals from photo interrupters in response to a movement of a film damper of the eighth embodiment of the present invention.

The operation of the present embodiment is described hereinafter. The relationship between the movement of the film damper 220 and the variation of the output signal from the photointerruptors 221 and 222 is explained. The sequence how the microcomputer 231 detects the position of the film damper 220 in accordance with these output signals is also explained. FIG. 25 shows the relationship of the positions between the photointerruptors 221 and 222 and the hole 226 in accordance with the movement of the film damper 220. FIG. 26 shows the signal wave output from the photointerruptors in accordance with the movement of the film damper 226. The wave (a) represents the output signal from the photointerruptor 221 and the wave (b) represents the output signal from the photointerruptor 222. The numerals on the coordinate of FIG. 26 represents the position. The microcomputer 231 increases and decreases the count number in accordance with the change of the output signal of the photointerruptors 221 and 222 from "OFF " position to "ON" position The microcomputer 231 adds the count number when the motor 216 rotates forward direction, the microcomputer. 231 decreases the count number when the motor 216 rotates reverse direction. Accordingly, the microcomputer 231 decides the position of the film damper 220, e.g. the distance from the standard position (position 0). FIG. 25(a) shows the position 0. The photointerruptor 221 detects the large hole 226a and the photointerruptor 222 detects the hole 226b at the position shown in FIG. 25(a). Both signals output from the photointerruptors 221 and 226 becomes "ON" position when the film damper 220 locates the position 0.

The hole 226 becomes the position shown in FIG. 25(b) when the film damper 220 rotates from the position 0 by the distance L3. The position shown in FIG. 25(b) represents the condition that the photointerruptor 221 detects the edge portion of the large hole 226a and the photointerruptor 222 detects the intermediate portion of the holes 226b and 226c. The position shown in FIG. 25(b) is named as position 1. No signal outputs from the photointerruptor 222 between the conditions of position 0 and position 1, therefore microcomputer 231 does not count the signal.

The holes 226 becomes the position 2 shown in FIG. 25(c) when the film damper moves toward the direction indicate by the arrow by the distance L3 from the position 1. The photointerruptor 221 detects the intermediate portion of the large hole 226a and the hole 226b, and the photointerruptor 222 detects the hole 226c when the film damper becomes the position 2 (shown in FIG. 25(c)). As shown from FIG. 26, the photointerruptor 222 outputs the signal from the "OFF" position to the "ON" position when the film damper 220 becomes the position 2, so that the micro computer 231 adds one count of the signal. The film damper becomes the position 3 shown in FIG. 25(d) when the film damper moves toward the direction indicate by the arrow from the position 2. The photointerruptor 221 outputs the signal from the "OFF" position to the "ON" position as shown in FIG. 26 when the film damper 220 becomes the position 3, so that the microcomputer 231 adds one more count of the signal. The film damper 220 becomes the position 4 shown in FIG. 25(e) when the film damper 220 further progresses from the position 3. The photointerruptor outputs the signal from the "OFF" position to the "ON" position as shown in FIG. 26 when the film damper becomes the position 4, so that the microcomputer 231 adds one more count of the signal. The film damper becomes the H position when the film damper 220 further progresses toward the direction indicated by the arrow, as shown in FIG. 25(f). The photointerruptor detects the hole 226y and the photointerruptor 222 detects the large hole 226 when the film damper becomes its edge portion the shown in FIG. 25(f). The number of the holes 226 of this embodiment is 37.

The photointerruptor 221 outputs the signal from the "OFF" condition to the "ON" condition when the film damper 220 reaches the position 37, so that the micro computer 231 adds one more count of the signal.

As described above, the microcomputer adds the counts from the photointerruptors 221 and 222 when the film damper progresses by the distance L3. However, no signal is counted when the film damper progresses from the position 0 to the position 1.

Figure 27:
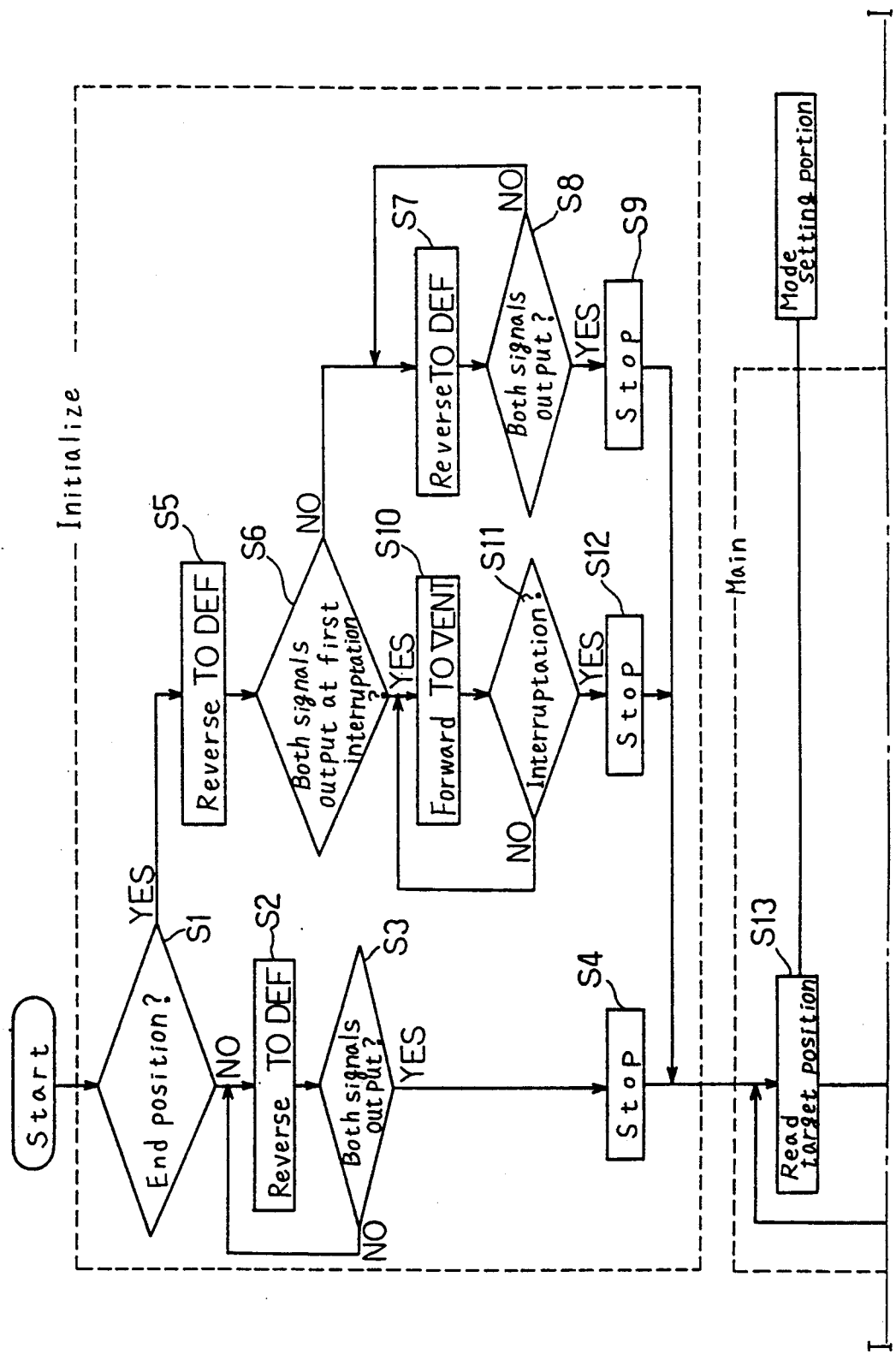
FIG. 27 is a flow chart showing an operation of a microcomputer of the eighth embodiment of the present invention.
Figure 28:
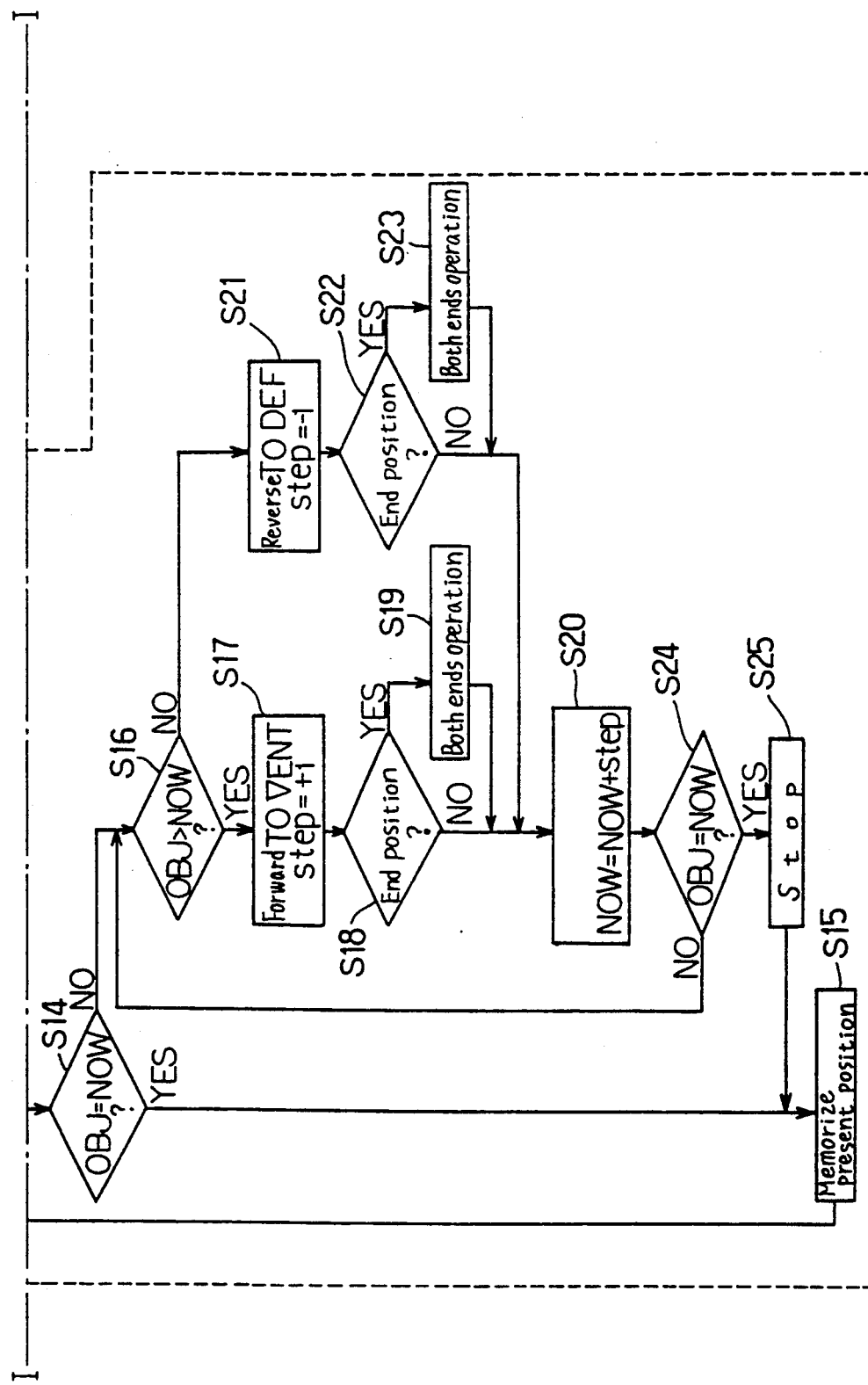
FIG. 28 is a flow chart showing an operation of the microcomputer of the eighth embodiment of the present invention.

The controlling sequence of the microcomputer 231 is explained hereinafter by referring FIG. 27. In this embodiment the position of the defrosting mode is represented by the position 0, the position of the heating and defrosting mode is represented by the position 9, the position of the heating mode is represented by the position 15, the position of bi-level mode is represented by the position 23, and the position of the ventilating mode is represented by the position 37. The flowchart shown in FIG. 28 is connected to the flowchart shown in FIG. 27 at the dotted line I—I.

The microcomputer 231 starts its controlling sequence when the electricity is supplied. The microcomputer 231 decides whether the film damper 220 positions its end position by referring whether the both interruptors 221 and 222 become ON condition simultaneously (Step S1). The micro computer 231 outputs the signal toward the motor 216 in order to progress the film damper toward the defrosting mode when the film damper does not position its end position (Step S2). The film damper 220 is progressed from the ventilating mode toward the defrosting mode when the motor 216 rotates its forward direction, and the film damper 220 progresses from the defrosting mode toward the ventilating mode when the motor 216 rotates its reverse direction.

Then the microcomputer decides whether the both photointerruptor 221 and 222 detect the hole 216 simultaneously or not (Step S3). If the both signals are detected simultaneously ("Yes" of Step S3), then the motor 216 is stopped (Step S4) in order to make the defrosting mode. When the both signals are not detected simultaneously ("No" of Step S3), the microcomputer 231 then starts to progress the film damper 220 (Step S2).

When the film damper is detected its end position ("Yes" of Step S1), the microcomputer 231 makes the motor 216 rotate (S5) in order to decide whether the film damper locate the position 0 or the film damper 220 locates the position 37. The microcomputer decides whether or not both signals are output simultaneously when the very beginning signal from the photointerruptor is input (Step S6).

When the both signals are not output simultaneously ("No" of Step S6), the position of the film damper 220 detected by the Step S1 is decided as the position 37. Namely, the film damper 220 progresses from the position 37 to the position 35 when the motor 216 rotates reversewardly at Step S5, so that both signals are not output ("No" of Step S6) when the photointerruptor 221 outputs the very beginning signal. When the both signals are not output simultaneously ("No" of Step S6), the motor 216 is rotated reversewardly in order to progress the film damper 220 toward the position 0 (Step S7). At Step S8 the microcomputer 231 decides whether or not the both signals are output simultaneously just similar as Step S3. If the both signals are not output simultaneously ("No" of Step S8) the microcomputer 231 repeats the sequence of the Step S7, and when the both signals are output simultaneously ("Yes" of Step S8) the microcomputer makes the motor 216 stop (Step S9). "Yes" of Step S8 represents that the film damper reaches the position 0. "Yes" of Step S6 also represents the condition that the position of the film damper 220 detected by Step S1 is position 0. Namely, the film damper 220 is progressed until the position that the both photointerruptors 221 and 222 detect the large hole 216a when the motor 216 rotates reversewardly by Step S5, and the both signals are simultaneously output when the photointerruptor 222 outputs the very beginning signal ("Yes" of Step S6). The film damper 220 is then progressed toward the position 37 by rotating the motor forwardly (Step S10). The microcomputer 231 then decides whether the signal is output or not (Step S11). If no signal is output ("No" of Step S10) the motor 216 continuously rotates forwardly. If the signal is output ("Yes" of Step S11), the microcomputer 231 makes the motor 216 stop because the film damper 220 is already reached the position 0 (Step S12).

As described above, the film damper 220 is initially becomes the position 0 then the mode selecting signal transferred from the mode setting portion 230 is detected in order to read the objected position (OBJ) for the movement of the film damper 220 (Step S13). The target position (OBJ) is compared with the present position (NOW) in order to decide whether the present (NOW) becomes the objected position (OBJ) (Step S14). If the present position (NOW) becomes to the objected position (OBJ) ("Yes" of Step S14), the present position (NOW) is memorized (Step S15), and then repeats the sequence of Step S13.

When the present position (NOW) is not equal to the target position (OBJ) at Step 14, it is judged whether the value of target position (OBJ) is larger than the value of present position (NOW) at Step 16. When the target position (OBJ) is larger than the present position (NOW), the electric motor 216 rotates forwardly at Step 17. Right after the motor 216 rotates, it is judged, at Step 18, whether the present position of the film damper 220 becomes the end position.

When the film damper 220 is not at the end position at Step 18, the microcomputer 231 adds one count on the value of present position (NOW) at Step 20. When the film damper 220 is at the end position at Step 18, that is, when the present position (NOW) has the value of 0 or 37, the value is converted from 0 to 1 and from 37 to 36 and memorized in the microcomputer 231 (Step 19). Thus, Step 20 is carried out.

Since the present position (NOW) is memorized as 1 even when the film damper 220 is stopped at the position 0, the deviation of the film damper 220 caused by no starting signal from the photointerruptor is well prevented. Even when the film damper 220 is stopped at the position 37, the present position (NOW) is memorized as 36 because of the same reason. Such a operation described above is called a both end operation.

When the value of the target position (OBJ) is not larger than the value of the present position (NOW), the electric motor 216 rotates backwardly (Step 21). Right after the electric motor 216 rotates, it is judged, at Step 22, whether the present position of the film damper 220 is equal to the end position in the same manner of Step 18.

When the film damper 220 is not positioned at the end position at Step 18, the operation of Step 20 is carried out. When the film damper 220 is positioned at the end position, the both end operation (Step 23) is carried out, and then Step 20 is carried out.

After the microcomputer 231 adds one count on the value of the present position (NOW) at Step 20, whether the value of present position (NOW) is equal to the value of the target position (OBJ) is judged at Step 24.

When the value of the present position (NOW) is not equal to the value of the target position (OBJ), the operation of Step 16 is carried out. When the both values are equal to each other, the electric motor 216 is stopped at Step 25 and the value of the present position (NOW) is memorized in microcomputer 231 at Step 15.

The operation of the actual mode selecting is described hereinafter by referring FIGS. 27, 28 and 29.

Figure 29:
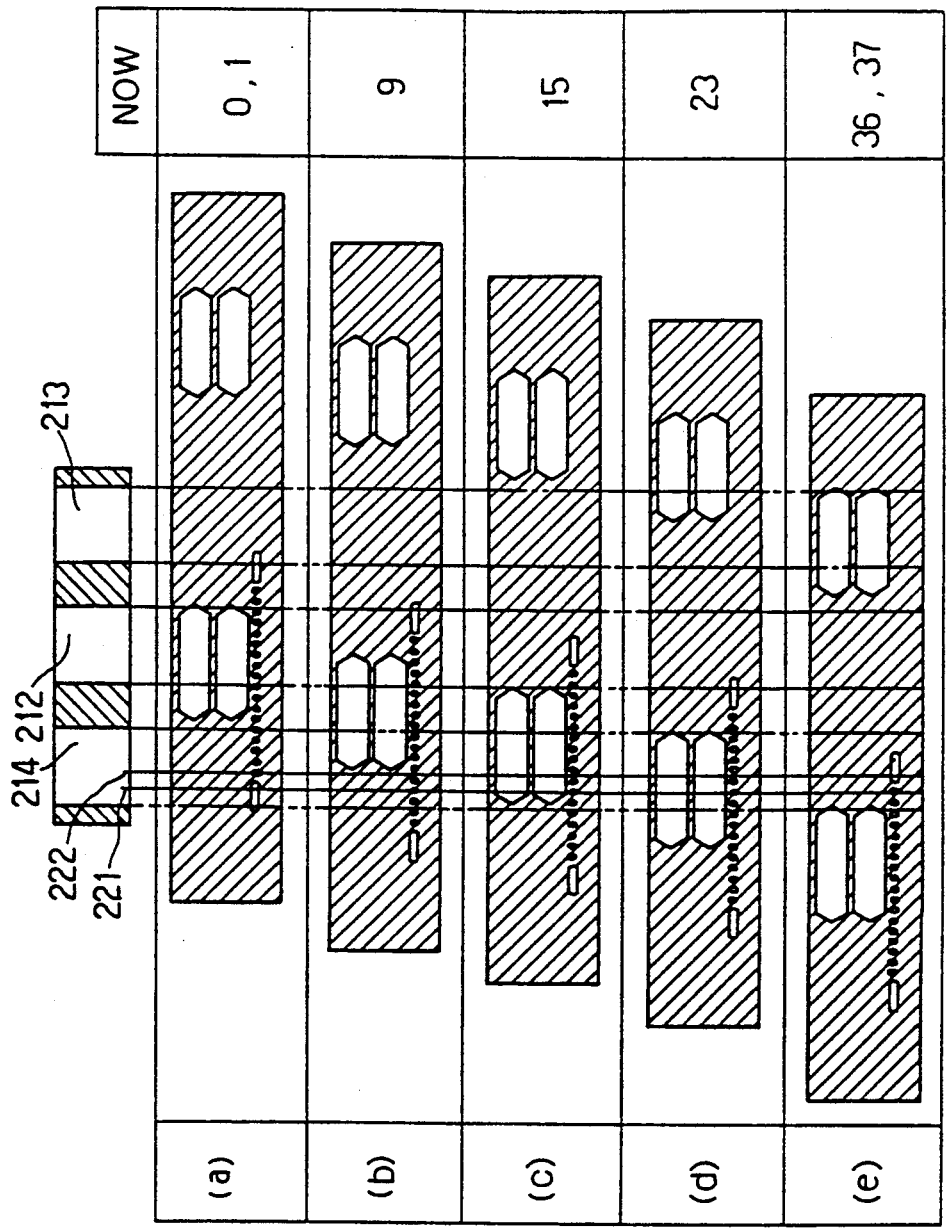
FIG. 29 is an explanation drawing showing relative positions between two photo interrupters and a detected object in each air-blowing mode.

FIG. 29 shows the positioning relation between the photointerruptor 221, the photointerruptor 222 and the holes 226, the value of the present position (NOW), and the positioning relation between the air outlet and the film damper in each mode. The values of the present position (NOW) after the both end operation are described as 0, 1, 37, 36 respectively at the right side in FIG. 29.

The film damper 220 is positioned at the defrosting mode as shown in FIG. 29(a) at Step 1 through Step 12.

Then, the film damper 220 in the defrosting mode as shown in FIG. 29(a) is moved into the heating mode as shown in FIG. 29(b).

In this event, since the value of the present position (NOW) is "0" and the value of the target position (OBJ) is "9", the value of the target position (OBJ) is detected as 9 at Step 13 and the result of Step 14 is "No". The result of Step 16 is "Yes" so that the electric motor 21 rotates forwardly. Since the value of the present position (NOW) is "0", the result of Step 18 is "Yes" and the both end operation is carried out so that the value of the present position (NOW) becomes "1". The microcomputer 231 adds one count on the value of the present position (NOW) at Step 20, so that the value becomes "2". The result of Step 24 is "No", and then Step 16 is carried out again. The result of Step 16 is "Yes", and the electric motor 216 rotates forwardly at Step 16.

Since the value of the present position is "2" in this event, the result of Step 18 is "No". The microcomputer 231 adds one more count at Step 20, so that the value of the present position becomes "3". The result of Step 24 is "No", and then Step 16 is carried out again.

Such an operation described above is repeated. When the value of the present position (NOW) is "9", that is, when the film damper 220 is positioned at the position 9, whether the value of the target position (OBJ) is equal to the value of the present position (NOW) is judged at Step 24. After the electric motor 216 is stopped at Step 25, the microcomputer 231 memorizes the value of the present position as "9" and then Step 13 is carried out.

When the film damper 220 moves from the heating mode into the bi-level mode as shown in FIG. 28(d), the value of the present position is memorized as "9" at Step 15, the value of the target position is detected as "23" at Step 13 and the result of Step 14 is "No". The result of Step 16 is "Yes", and the electric motor 216 rotates forwardly at Step 17.

Since the value of the present position is "9", the result of Step 18 is "No". The microcomputer 231 adds one more count on the value of the present position at Step 20, so that the value of the same becomes "10". The result of Step 24 is "No", and then Step 16 is carried out again.

When the value of the present position becomes "23" during the operation described above, the result of Step 24 is "Yes" and the electric motor 216 is stopped at Step 25. The micro-computer 231 memorizes the value of the present position as "23", and then Step 13 is carried again.

When the film damper 220 moves from the bi-level mode to the defrosting mode as shown in FIG. 29(a), the value of the present position is memorized as "23" at Step 15 and the value of the target position is detected as"0". The results of Step 14 and Step 16 are "No", and then the electric motor 216 rotates backwardly.

Since the value of the present position is "23", the result of Step 22 is "No". The microcomputer adds one more count on the value of the present position, so that the value of the same becomes "22". The result of Step 24 is "No", and then Step 16 is carried out again.

When the value of the present position becomes "0" at Step 20 during the operation described above, both values of the present position and the target position are equal to each other at Step 24 and then the electric motor 216 is stopped at Step 25. The value "0" of the present position is memorized at Step 15, and then Step 13 is carried out again.

As described the present embodiment in detail above, the photointerruptor can be positioned on any place since the value of the film damper position is set "0" when the automotive air conditioner is assembled.

The film damper 220 reciprocates between the position 0 and the position 37. As shown in FIGS. 25(a) and 25(f), the film damper 220 moves between both ends wherein two of photointerruptors are ON simultaneously.

Since the microcomputer 231 does not count signal in the event of the moving of the film damper from the position "0" to the position "1" and from the position "37" to the position "36", the divergence may occur between the target position and the actual position of the film damper. However, such a divergence is well prevented by the both end operation.

The ratio of the interval L2 to the distance L3 is represented as the following equation.

$$L2/L3 = n \tag{1}$$

When 2 is substituted for n in the equation (1), the interval L3 is a half of interval L2 of each hole 226.

One of the two photointerruptors 221 and 222 detects the hole 226 when the film damper 220 moves a half of the interval L2. That is, when the film damper 220 moves by the interval L2, both of the photointerruptors 221 and 222 detect the hole 226 twice.

In other words, the film damper 220 is stopped twice. Since the position of holes is detected by the two photointerruptors rather than the one photointerruptor, the position of the film damper 220 is detected more accurately.

When the precise detection is not required, the number of the holes may be decreased in order to increase the opening area of the opening in the film damper and to increase the stretch strength of the film damper.

The detected object can be constituted by a black mark printed on a transparent film instead of holes in the film.

An electrical contact such as a limit switch can be used instead of the photointerruptor.

The position of the opening of the mode selecting damper for the each mode is selectable. The film damper can be used for an air mixture damper besides for the made selecting damper.

What is claimed is:

1. An automotive air-conditioner comprising:
   a casing forming an air passage through which an air passes;
   a film damper slidably disposed in said casing in such a manner to face to said air passage and having an opening thereon so that said film damper opens and closes said air passage;
   a detected object disposed on said film damper for indicating a position of said opening;
   detecting means for detecting said detected object and outputting a detecting signal; and
   driving means for driving said film damper so as to displace said opening to a target position based on said detecting signal.

2. An air-conditioner according to claim 1, wherein said detected object is comprised of plural parts which are lined along with a moving direction of said film damper, said detecting means is comprised of plural parts which are lined along with a moving direction of said film damper, and respective intervals of said detecting means and said detected objects are different from each other.

3. An air-conditioner according to claim 1, wherein said detected object is lined in plural rows along with a moving direction of said film damper in such a manner that each detecting means has a corresponding row so that each detecting means detects said detected objects in the corresponding row.

4. An air-conditioner according to claim 1, wherein said detected object is comprised of bar-code and said detecting means is comprised of a scanner which detects said bar-code.

5. An air-conditioner according to claim 1, wherein said detected object comprises plural holes, and said detecting means comprises a transmission photoelectric switch which detects said plural holes.

6. An automotive air-conditioner comprising:
   a casing forming an air passage through which an air passes;
   a film damper slidably disposed in said casing in such a manner to face to said air passage and having an opening thereon so that said film damper opens and closes said air passage;
   driving means for driving said film damper;
   a detected object disposed on said film damper for indicating a position of said opening;
   detecting means for detecting said detected object and outputting a present position signal showing a present position of said film damper;
   a made detecting means for outputting a target position signal showing a target position of said film damper corresponding to a selected air-blowing mode;
   a comparing means for comparing said present position signal with said target position signal and outputting a stop signal when said present position signal coincides with said target position signal; and
   a control means for controlling said driving means in response to at least one of a result of comparison of said present position signal with said target position signal and said step signal.

* * * * *